US009719370B2

(12) United States Patent
Loffredo

(10) Patent No.: US 9,719,370 B2
(45) Date of Patent: Aug. 1, 2017

(54) LINKAGE SYSTEM WITH WEAR REDUCTION

(75) Inventor: Constantino V. Loffredo, Newington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 3027 days.

(21) Appl. No.: 11/693,871

(22) Filed: Mar. 30, 2007

(65) Prior Publication Data

US 2008/0236136 A1  Oct. 2, 2008

(51) Int. Cl.
| | |
|---|---|
| F01D 25/04 | (2006.01) |
| F01D 17/10 | (2006.01) |
| F01D 17/14 | (2006.01) |
| F02C 9/18 | (2006.01) |
| F02K 1/82 | (2006.01) |
| F02K 3/075 | (2006.01) |

(52) U.S. Cl.
CPC ............ *F01D 25/04* (2013.01); *F01D 17/105* (2013.01); *F01D 17/141* (2013.01); *F02C 9/18* (2013.01); *F02K 1/822* (2013.01); *F02K 3/075* (2013.01); *F05D 2220/36* (2013.01); *F05D 2260/52* (2013.01); *F05D 2260/56* (2013.01); *F05D 2260/96* (2013.01); *Y02T 50/675* (2013.01)

(58) Field of Classification Search
USPC ................ 74/469; 16/224, 284, 296; 403/90
See application file for complete search history.

(56) References Cited

U.S. PATENT DOCUMENTS

| | | | | |
|---|---|---|---|---|
| 472,783 | A | * | 4/1892 | Loomis ........................... 267/72 |
| 2,526,105 | A | * | 10/1950 | Adams ........................... 464/115 |
| 2,886,998 | A | * | 5/1959 | Scott ............................. 81/177.9 |
| 3,691,788 | A | * | 9/1972 | Mazziotti ...................... 464/139 |
| 4,150,802 | A | | 4/1979 | Evelyn et al. |
| 4,447,139 | A | * | 5/1984 | Biber ............................ 359/384 |
| 4,660,767 | A | | 4/1987 | Scrace |
| 4,673,329 | A | * | 6/1987 | Kato ........................... 414/744.5 |

(Continued)

FOREIGN PATENT DOCUMENTS

| | | |
|---|---|---|
| EP | 0879947 | 11/1998 |
| EP | 0978689 | 2/2000 |

(Continued)

OTHER PUBLICATIONS

Extended European Search Report, dated Dec. 1, 2011, EP Application No. 08250308.7.

*Primary Examiner* — William C Joyce
(74) *Attorney, Agent, or Firm* — Carlson, Gaskey & Olds, P.C.

(57) ABSTRACT

A linkage system includes a pivot bias assembly at each pivot which removes internal clearances and resultant vibratory wear. The pivot bias assembly includes a cavity which defines an axis transverse to the pivot axis. A spring biased piston is located therein to provide a radial load toward the rotation pivot to close radial clearances. The spring loaded piston reduces all the radial internal clearances to zero to reduce vibratory wear created by engine vibratory inputs. An assembly flat is positioned such that the component is assembled in a non-operating angular position such that the spring biased piston is under minimal or no load then the component is rotated into operating position so as to preload the spring biased piston.

1 Claim, 9 Drawing Sheets

(56) References Cited

U.S. PATENT DOCUMENTS

| | | | |
|---|---|---|---|
| 4,767,055 A | 8/1988 | Ward | |
| 5,307,624 A | 5/1994 | Even-Nur et al. | |
| 5,461,856 A | 10/1995 | Mendia et al. | |
| 5,515,575 A * | 5/1996 | Pinazza | 16/228 |
| 5,740,988 A | 4/1998 | Ausdenmoore | |
| 5,794,850 A | 8/1998 | Gutierrez, Jr. | |
| 5,797,544 A | 8/1998 | Ward | |
| 5,813,611 A | 9/1998 | Cires et al. | |
| 5,927,815 A * | 7/1999 | Nakamura et al. | 297/411.38 |
| 6,145,416 A * | 11/2000 | Bonniot | 81/177.75 |
| 6,240,720 B1 | 6/2001 | Tseng et al. | |
| 6,299,077 B1 | 10/2001 | Harmon et al. | |
| 6,393,664 B1 * | 5/2002 | Habegger et al. | 16/335 |
| 6,721,991 B2 * | 4/2004 | Dioguardi | 16/228 |
| 6,767,153 B1 * | 7/2004 | Holbrook | 403/56 |
| 7,028,373 B2 * | 4/2006 | Harmon et al. | 16/284 |
| 7,032,387 B2 | 4/2006 | Germain et al. | |
| 7,043,898 B2 | 5/2006 | Rago | |
| 7,100,358 B2 | 9/2006 | Gekht et al. | |
| 2007/0138358 A1 * | 6/2007 | Chang | 248/205.5 |

FOREIGN PATENT DOCUMENTS

| | | |
|---|---|---|
| EP | 1398464 | 3/2004 |
| EP | 1544545 | 5/2010 |

\* cited by examiner

LINKAGE SYSTEM WITH WEAR REDUCTION

RESEARCH OR DEVELOPMENT

This invention was made with Government support under F33657-99-C-1236 awarded by The United States Air Force. The Government has certain rights in this invention.

BACKGROUND OF THE INVENTION

The present invention relates to a gas turbine engine, and more particularly to a linkage system which provides a load to each articulating joint to artificially remove internal clearances and reduce vibratory wear when the linkage is in an unloaded condition.

Gas turbine engine exhaust ducts include a liner disposed between the engine exhaust gas path and the engine outer casing or duct. Cooling air is flowed between the cooling liner and duct then discharged over the seals and flaps of the nozzle located at the rear end of the exhaust duct. In order to improve engine operation and performance, exhaust duct cooling air is carefully rationed.

As the engine is subjected to large core pressure gradients at various operating conditions, a rotational flow balance system includes a rotatable control member that is rotated to control the quantity of cooling airflow. Although effective, each rotational flow balance system typically includes a linkage system which may be unloaded during certain operational conditions. While unloaded, the linkage may experience undue wear at connections between the movable components.

Accordingly, it is desirable to provide a linkage system which removes internal clearances and resultant vibratory wear otherwise created by two or more adjacent components vibrating against each other across a clearance without additional component to component wear sites and undesirable modal vibration therefrom.

SUMMARY OF THE INVENTION

A linkage system according to the present invention includes a pivot bias assembly at each pivot which removes internal clearances and resultant vibratory wear. This invention is applicable to any linkage that may operate in an unloaded condition.

The pivot bias assembly includes a cavity which defines an axis transverse to a pivot axis. A piston is biased by a spring located therein to provide a radial load along axis toward the rotation pivot axis to close radial clearances. The spring loaded piston reduces all the radial internal clearances to zero to reduce vibratory wear created by engine vibratory inputs.

During assembly, the spring and piston are inserted into the piston cavity. The component is aligned with the pivot axis such that an assembly flat is utilized to press the spring and piston into the piston cavity. The assembly flat is positioned such that the component is assembled in a non-operating angular position such that the spring biased piston is under minimal or no load. This readily facilitates assembly. The component is then rotated into operating position—off the assembly flat—so as to preload the spring biased piston.

The present invention therefore provides a linkage system which removes internal clearances and resultant vibratory wear otherwise created by two or more adjacent components vibrating against each other across a clearance without additional component to component wear sites and undesirable modal vibration therefrom.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
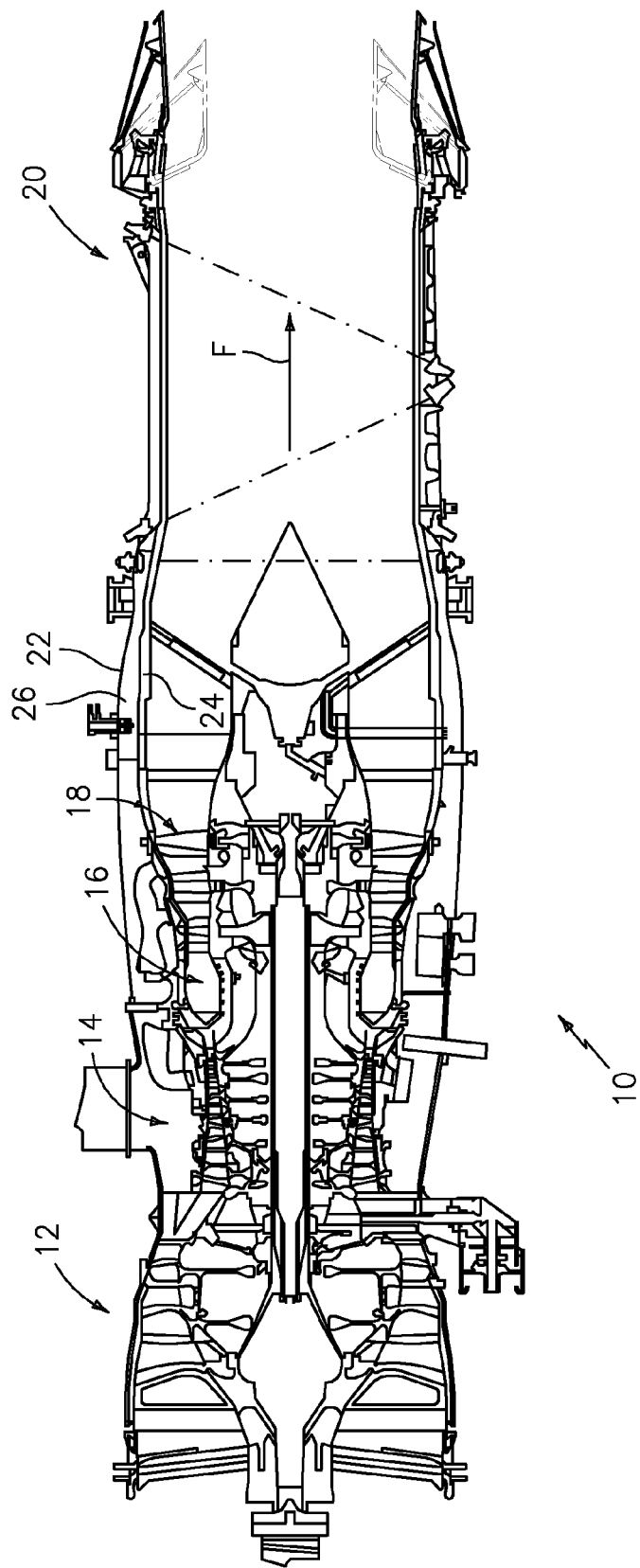
FIG. 1 is a general sectional view an exemplary gas turbine engine embodiment for use with the present invention.

FIG. 1 schematically illustrates a gas turbine engine 10 which generally includes a fan section 12, a compressor section 14, a combustor section 16, a turbine section 18, and a nozzle section 20. Within and aft of the combustor 16, engine components are typically cooled due to intense temperatures of the combustion core gases.

Figure 2:
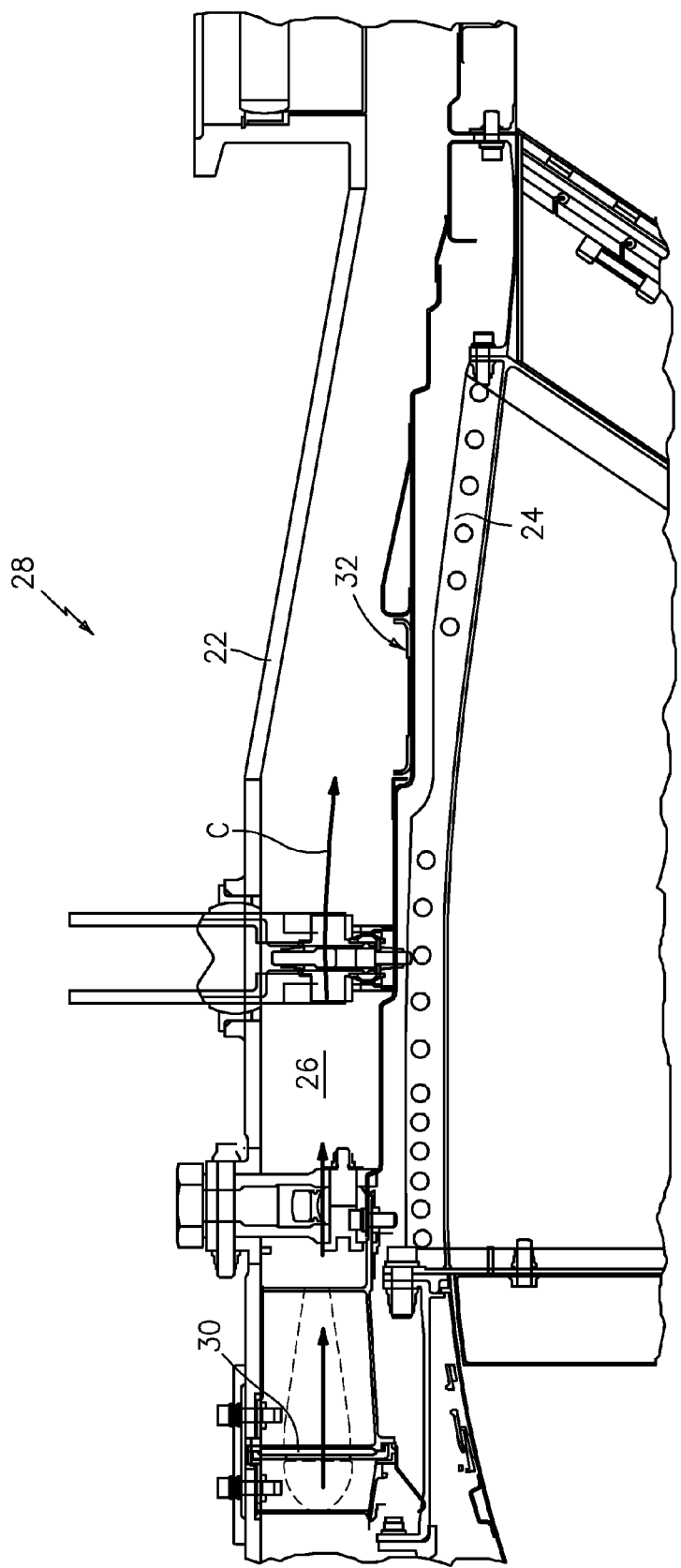
FIG. 2 is an expanded view of a rotational flow balance system within a fan bypass section of the gas turbine engine.

An outer engine case 22 and an inner cooling liner structure 24 define an annular secondary fan bypass flow path 26. It should be understood that various structure within the engine may be defined by the outer engine case 22 and the inner cooling liner structure 24 to define various cooling airflow paths such as the disclosed fan bypass flow path 26. The fan bypass flow path 26 guides a cooling airflow (illustrated schematically by arrows C; FIG. 2) between the outer engine case 22 and the inner cooling liner structure 24. Cooling airflow C and/or other airflow that is different from the exhaust gas flow (illustrated schematically by arrow F) is typically sourced from the fan section 12 and/or compressor section 14. The cooling airflow C is utilized for a multiple of purposes including, for example, pressurization and partial shielding of the nozzle section 20 from the intense heat of the exhaust gas flow F during particular operational profiles.

Referring to FIG. 2, a rotational flow balance system 28 generally includes a fan duct blocker ring 30 and a modulated exhaust cooling (MEC) ring 32. The fan duct blocker ring 30 and the modulated exhaust cooling ring 32 are rotated between a blocking position and an open position dependent on whether cooling airflow C is required. Under certain conditions, such as when an aircraft is hovering, less cooling airflow is required in the nozzle section 20 and by blocking the cooling airflow thereto, additional cooling airflow then becomes available for other purposes.

Figure 3:
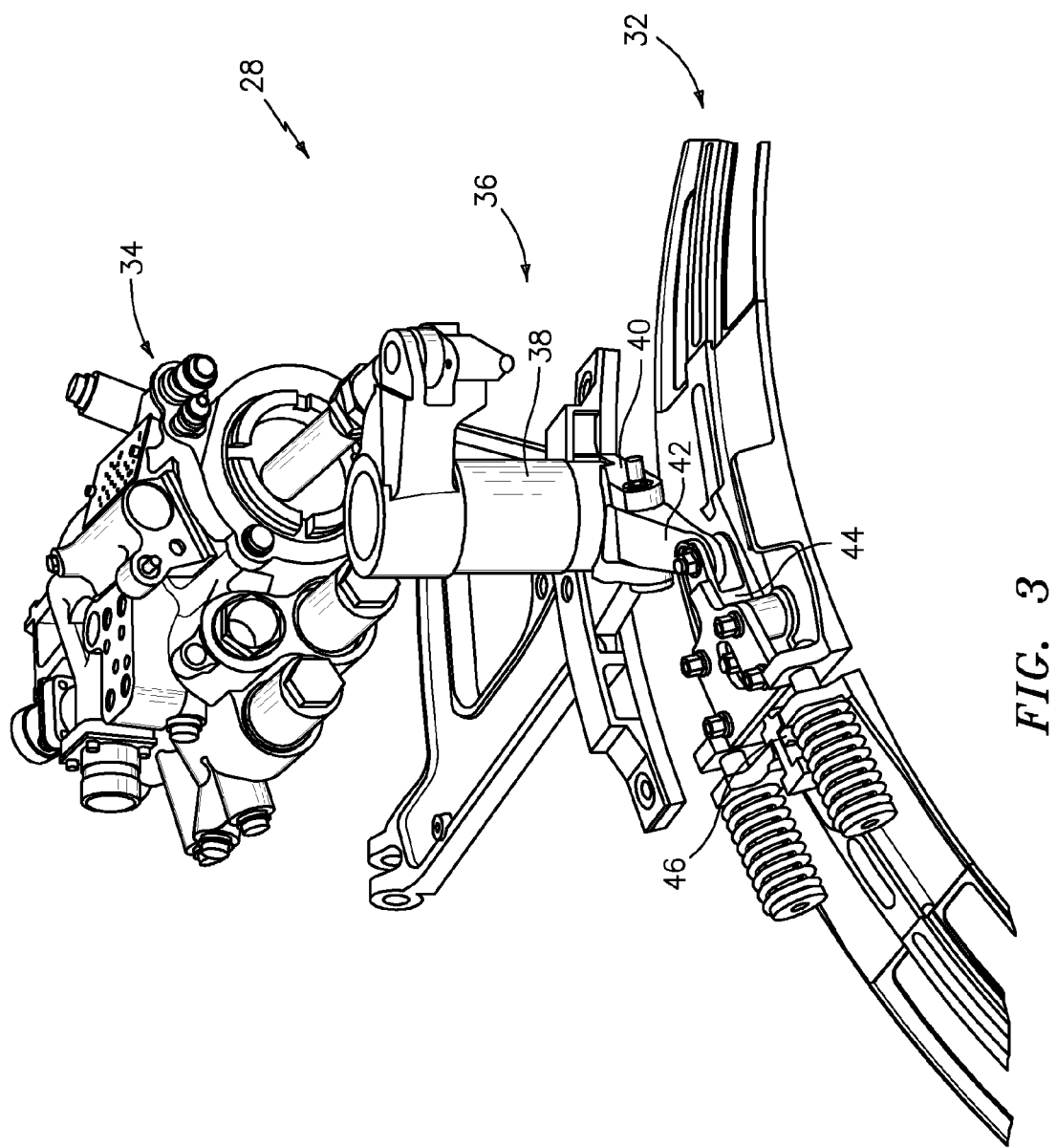
FIG. 3 is a perspective view of a rotational flow balance system.

Referring to FIG. 3, the rotational flow balance system 28 includes an actuator system 34 having a hydraulic, pneumatic or electromagnetic actuator which controls operation of both the fan duct blocker ring 30 (FIG. 2) and the MEC ring 32 through the linkage system 36. The linkage system 36 is driven by the actuator system 34 such that the MEC ring 32 can dwell or stop while the fan duct blocker ring 30 remains moveable to satisfy operational requirements. During some such conditions, at least some components of the linkage system 36 may be in an unloaded condition. It should be understood that although the MEC ring 32 of the rotational flow balance system 28 is illustrated in the disclosed embodiment as an example of a system which will benefit from the linkage system of the present invention, any linkage system which may in some conditions be unloaded will also benefit from the present invention.

Figure 4:
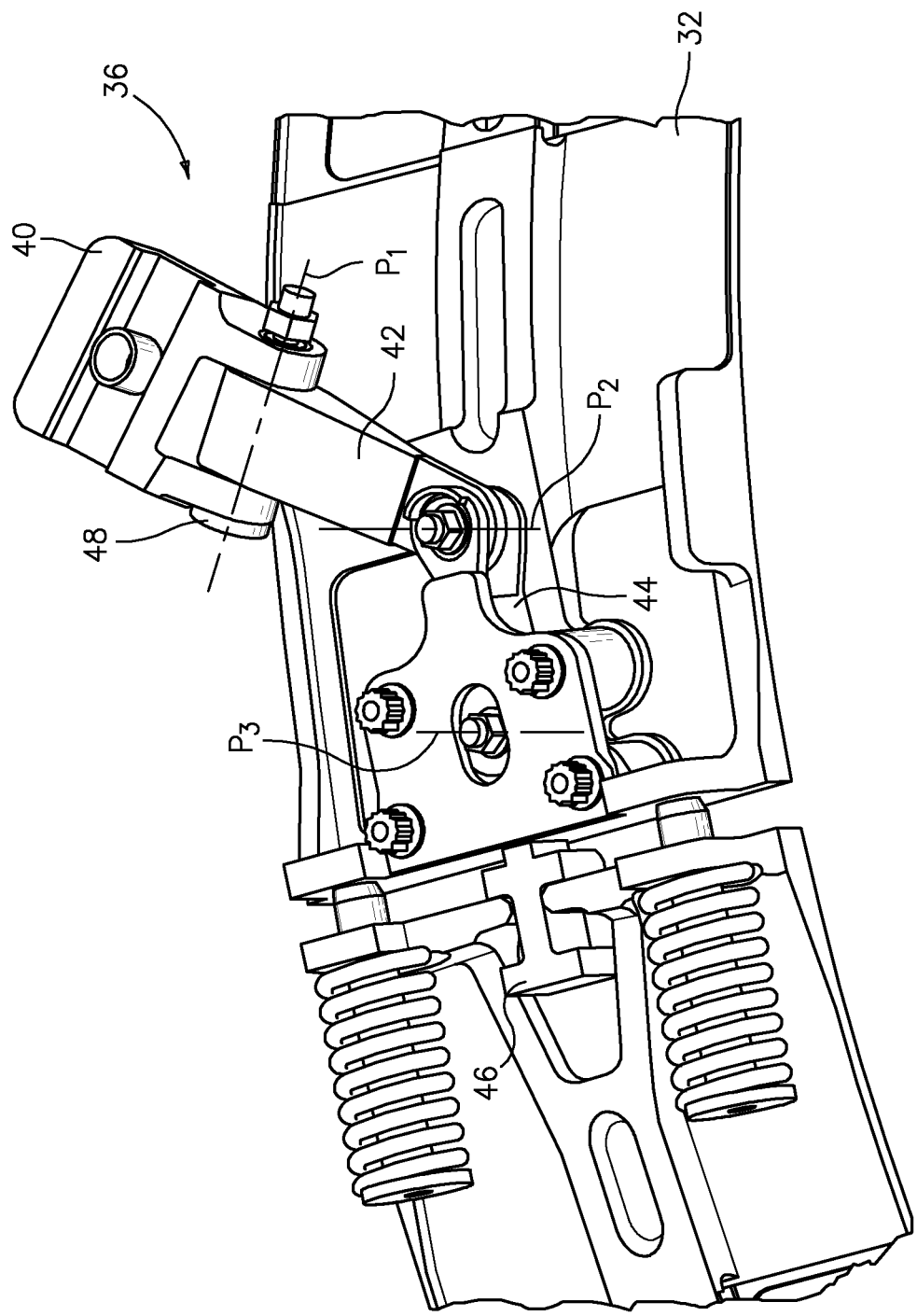
FIG. 4 is an expanded perspective view of a linkage system for the rotational flow balance system of FIG. 3.
Figure 5:
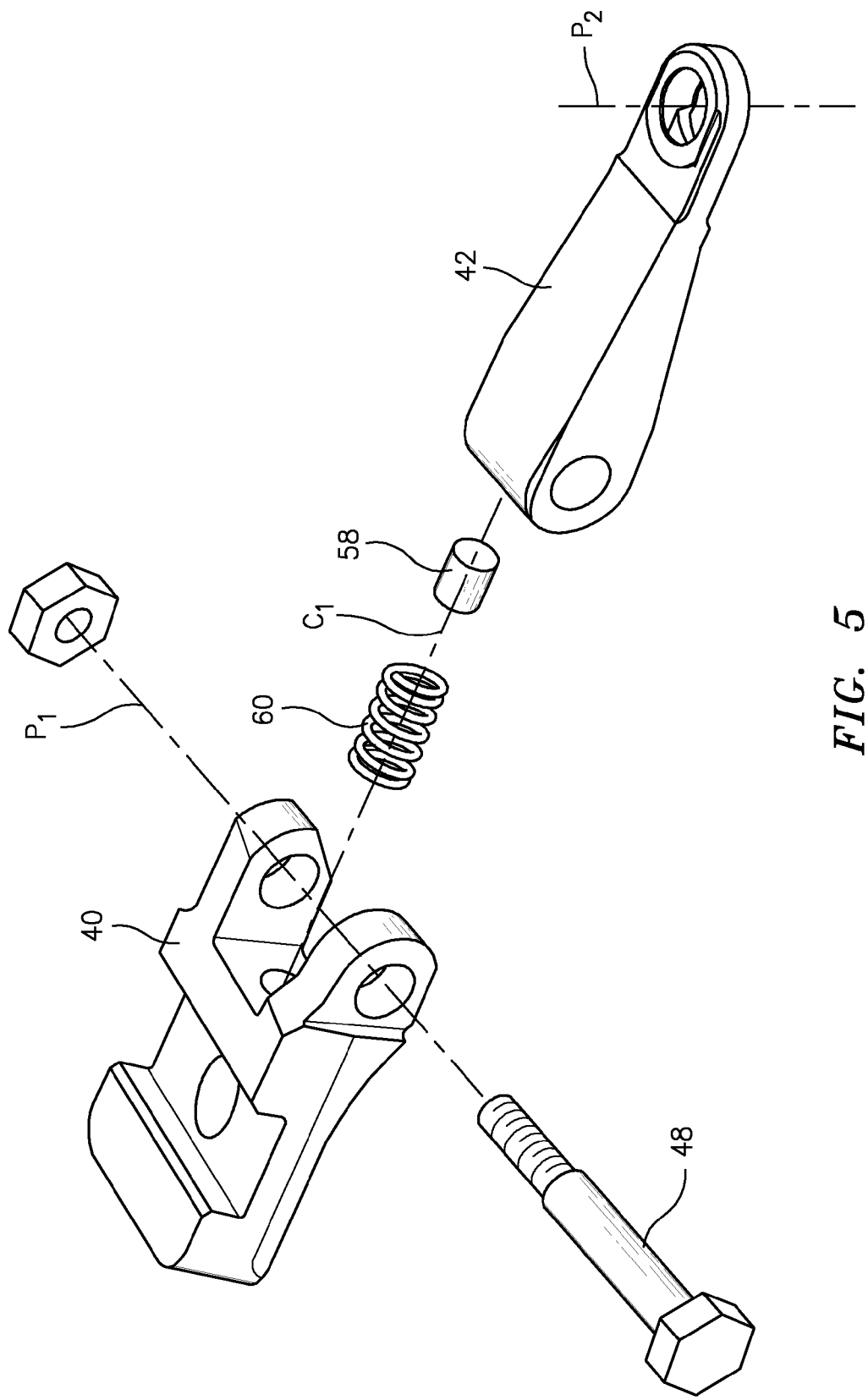
FIG. 5 is an exploded view of a portion of the link system.

Referring to FIG. 4, the linkage system 36 generally includes a torque tube 38 (FIG. 3), an inner component 40, a lever arm 42, a connector link 44, and a push-pull link 46. The linkage system 36 rotates the MEC ring 32 to modulate cooling airflow C. The inner component 40 is mounted to the lever arm 42 about a pivot axis P1 which is defined by a bolted connection 48 (FIG. 5). The lever arm 42 is mounted to the connector link 44 about a pivot axis P2 which is defined by a pinned connection 50. The connector link 44 is also mounted to the push-pull link 46 about a pivot axis P3 which is defined by a bolted connection 52.

Figure 6:
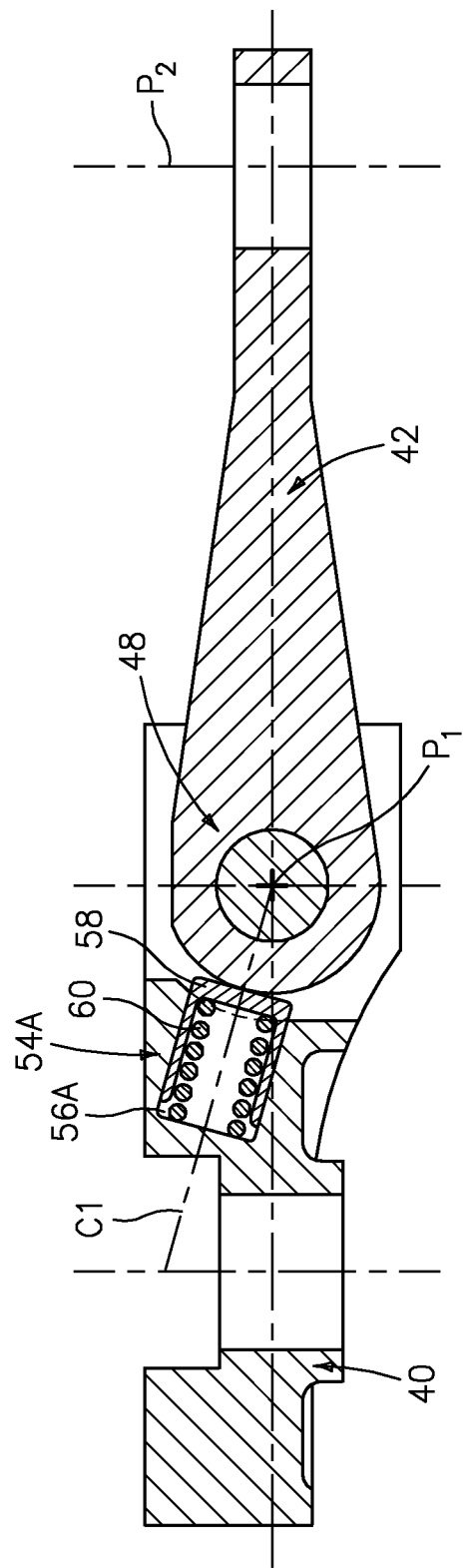
FIG. 6 is a longitudinal sectional view of the portion of the linkage system illustrated in FIG. 5.

Referring to FIG. 5, the inner component 40 includes a pivot bias assembly 54A including a cavity 56A which defines an axis C1 transverse to the pivot axis P1. A piston 58 which is biased by a bias member 60 such as a spring is located therein to provide radial load along axis C1 toward the rotation pivot P1 to close radial clearances of the bolted connection 48, the inner component 40 and the lever arm 42 (FIG. 6). That is, the spring-loaded piston 58 biases out internal clearances and the resultant vibratory wear otherwise created by clearances between the components without creation of additional component-to-component wear sites and potential undesirable modal vibration therefrom.

Axis C1 may be angled relative to axis C2 (FIG. 6) to intersect axis P1. Axis C2 is defined between and parallel to arms 40A which capture the lever arm 42 therebetween through the connection 48.

Figure 7A:
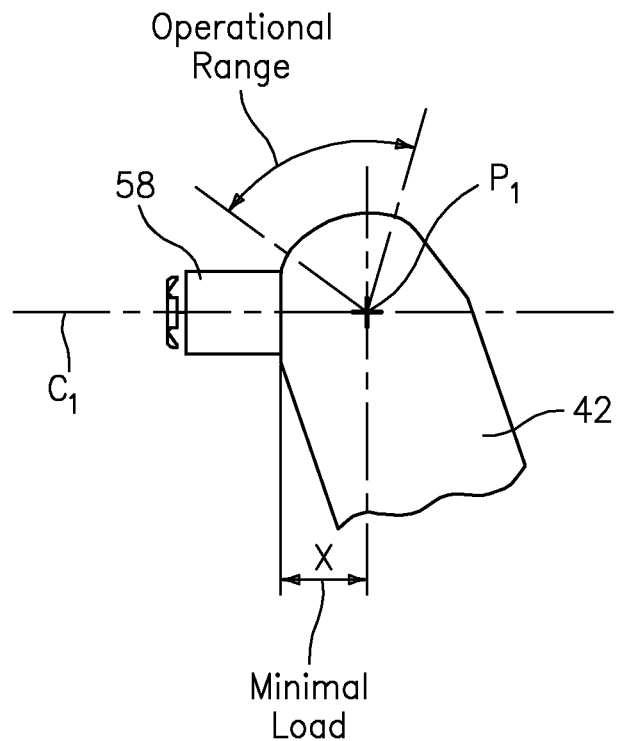
FIG. 7A is a top view of the linkage system of FIG. 5 in an assembly position.
Figure 7B:
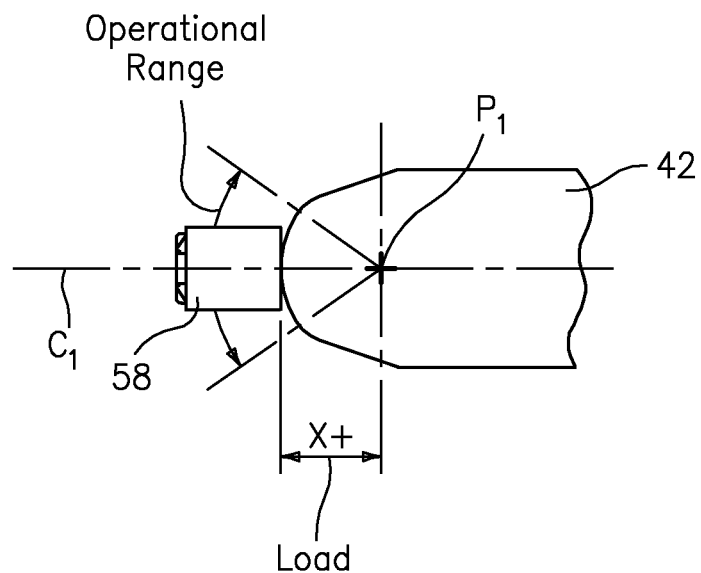
FIG. 7B is a top view of the linkage system of FIG. 5 in an operational position.
Figure 8:
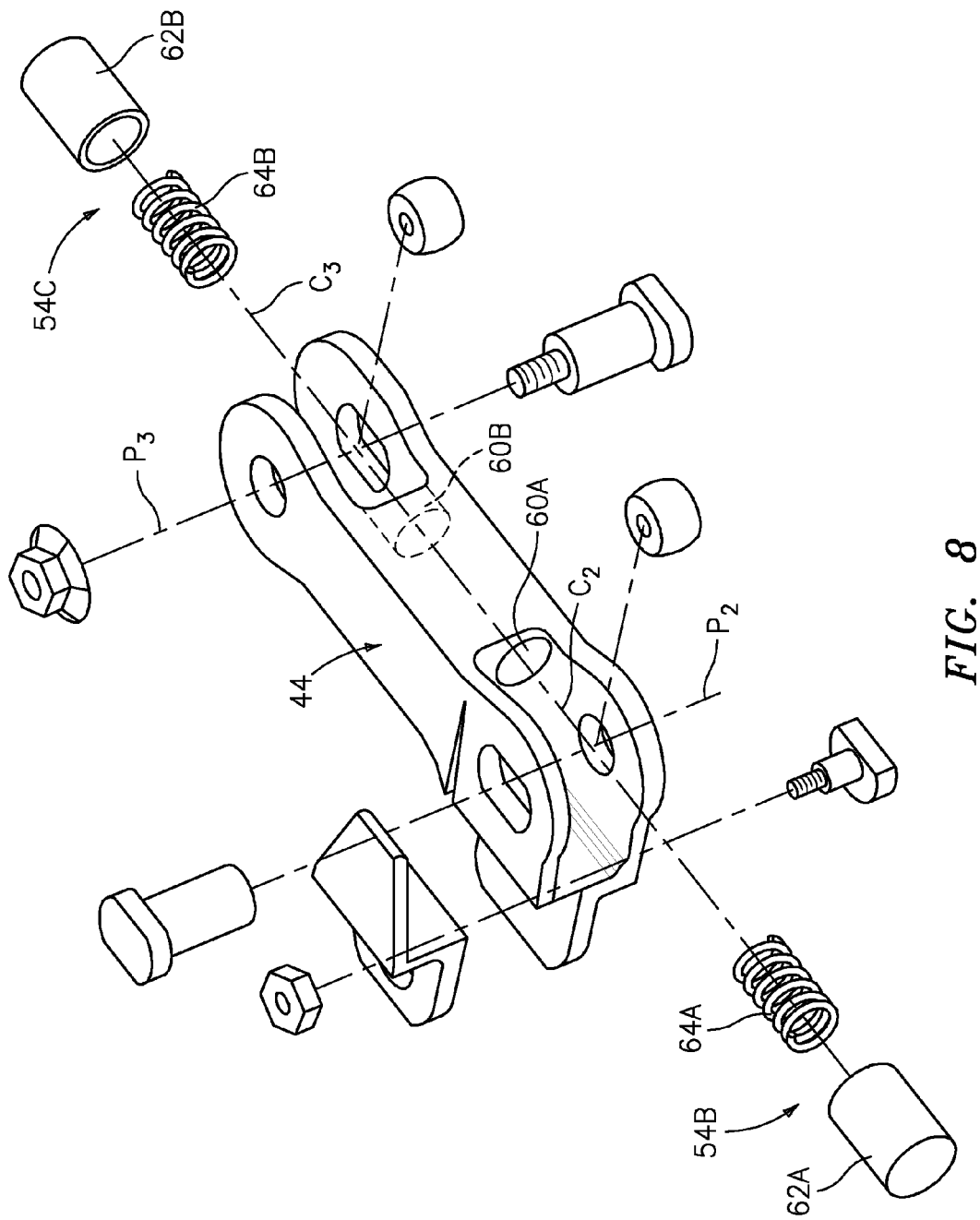
FIG. 8 is an exploded view of a connector link of the link system illustrated in FIG. 5.
Figure 9A:
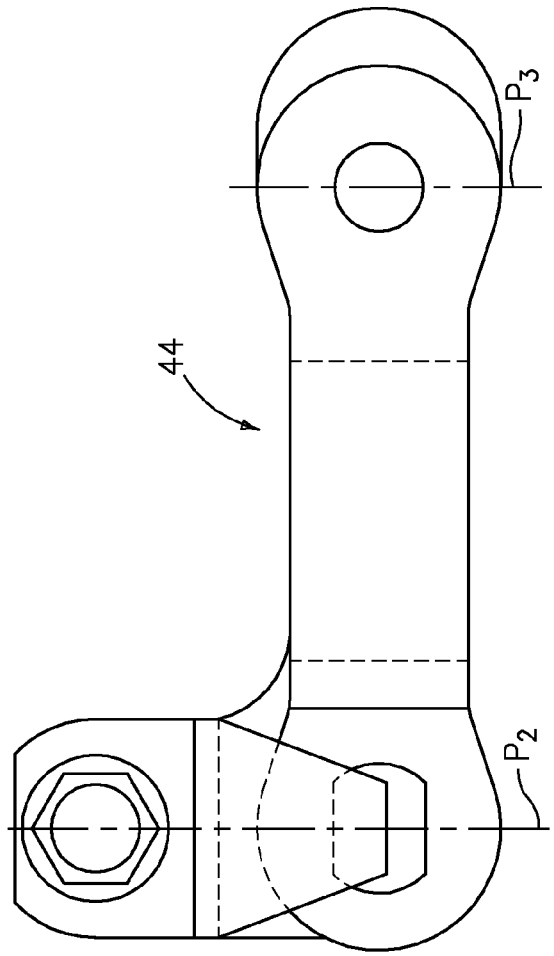
FIGS. 9A-9C are top, side and end views of the connecting link of FIG. 8.
Figure 9B:
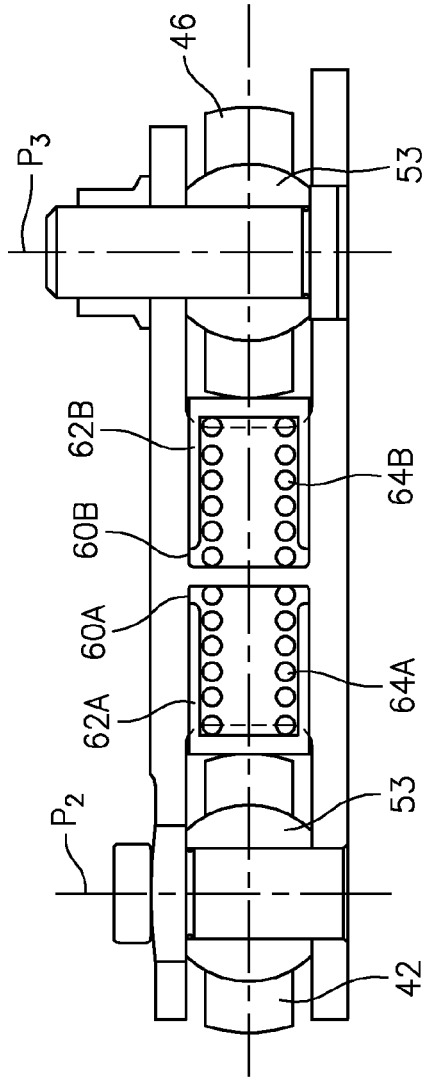
Figure 9C:
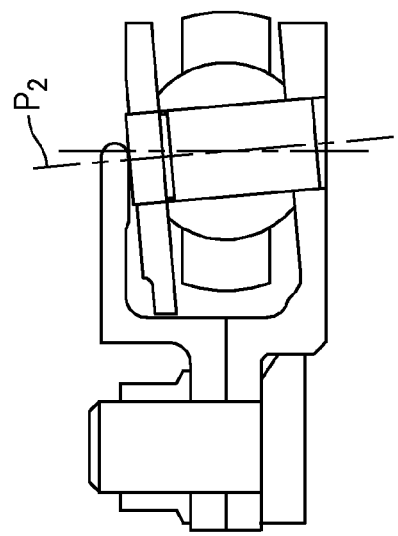

Referring to FIG. 7A, during mechanism assembly, the spring 60 and piston 58 are inserted into the piston cavity 56A. The lever arm 42 is aligned with the pivot axis P1 such that an assembly flat 42F is utilized to press the spring 60 and piston 58 into the piston cavity 56A. The assembly flat 42F is positioned such that the lever arm 42 is assembled in a non-operating angular position such that the spring biased piston 58 is under minimal or no load. This readily facilitates assembly. The arm 42 is then rotated into operating position—off the assembly flat 42F—so as to preload the spring biased piston 58 (FIG. 7B).

Referring to FIG. 8 and FIGS. 9A-9C, the connector link 44 has two pivot axes P2, P3 and therefore includes two pivot bias assemblies 54B, 54C. The pivot bias assembly 54A includes a first cavity 60A which defines an axis C2 transverse to the pivot axis P2. The pivot bias assembly 54B includes a second cavity 60B which defines an axis C3 transverse to the pivot axis P3. As described above a piston 62A, 62B is located within the respective first cavity 60A and second cavity 60B and is biased therein by a respective bias member 64A, 64B to provide a radial load along axis C2, C3 toward the rotation pivot P2, P3 and close radial clearances between the respective component parts.

Notably, the pinned connection 50 and the bolted connection 52 include spherical bushings 53 which are retained within the connector link 44. It should be understood that connections other than the bolted and pinned connections which also define a pivot axis will likewise be usable with the present invention as irrespective of the type of connection, the tolerances thereof will result in some clearance between the component parts which articulate about the pivot axis.

Although the cavity axes C2, C3 are generally in the same plane as the pivot axes P2, P3 unlike cavity axis C1 relative to pivot axis P1 (FIG. 6), the load applied by pistons 62A, 62B likewise applies a load to close radial clearances between the respective component parts. That is, each pivot axis P of the linkage system 36 includes a pivot bias assembly 54 which removes internal clearances within the linkage system 36.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A linkage system comprising:
    a first torque tube component having a cavity which defines a cavity axis, said first torque tube component defines a set of arms which define a pivot axis;
    a second torque tube component mounted with respect to said first torque tube component;
    a lever arm that defines an assembly flat, said lever arm movably mounted between said set of arms;
    a connection mounted along said pivot axis to pivotably mount said lever arm to said first torque tube component, said pivot axis transverse to said cavity axis;
    a bias member within said cavity;
    a piston biased by said bias member along said cavity axis toward said pivot axis to abut said lever arm, said lever arm pivotable between an operational angular position and a non-operating angular position about said pivot axis, said operational angular position locates said piston off said assembly flat so as to preload said piston to provide a radial load along said cavity axis toward said pivot axis to close radial clearances of said connection, said non-operational angular position locates said piston to abut said assembly flat such that said piston is under minimal load; and further comprising an actuator mounted to said first torque tube component to selectively rotate said first torque tube component with respect to said second torque tube component;

wherein said first torque tube component is indirectly mounted to said actuator via said second torque tube component.

\* \* \* \* \*